United States Patent [19]
Broome et al.
[11] Patent Number: 4,797,281
[45] Date of Patent: Jan. 10, 1989

[54] PROCESS FOR PREPARING WOOD PRESERVATIVE COMPOSITIONS

[75] Inventors: Andrew D. J. Broome, Warrington; Ian K. Egerton, Runcorn, both of England

[73] Assignee: Laporte Industries Limited, London, England

[21] Appl. No.: 3,741

[22] Filed: Jan. 16, 1987

[30] Foreign Application Priority Data

Jan. 23, 1986 [GB] United Kingdom ................. 8601570

[51] Int. Cl.[4] ............................................. A01N 59/22
[52] U.S. Cl. ..................................... 424/133; 424/137
[58] Field of Search ................................ 424/133, 137

[56] References Cited

U.S. PATENT DOCUMENTS

| | | | |
|---|---|---|---|
| 2,366,612 | 1/1945 | Hager | 424/137 |
| 2,438,511 | 3/1948 | McMahon | 424/137 |
| 3,957,494 | 5/1976 | Oberley | 424/137 |
| 4,103,000 | 7/1978 | Hartford | 424/137 |
| 4,218,249 | 8/1980 | Hill | 424/137 |
| 4,247,329 | 1/1981 | Mills | 424/137 |
| 4,313,976 | 2/1982 | Leach | 427/297 |

FOREIGN PATENT DOCUMENTS 1029298 4/1978 Canada .

*Primary Examiner*—Albert T. Meyers
*Assistant Examiner*—Richard Kearse
*Attorney, Agent, or Firm*—Kane, Dalsimer, Sullivan, Kurucz, Levy, Eisele and Richard

[57] ABSTRACT

Wood preservative compositions containing as active ingredients compounds of copper, of chromium and of arsenic are produced by mixing copper arsenate and sodium dichromate in an aqueous medium into which is introduced strong acid, for example sulphuric acid, effective to achieve a soluble product. The acid addition is preferably effective to reduce the pH to below 0. The composition so produced is a homogeneous paste which may be dissolved in water to working concentration and used for the preservation of wood by impregnation techniques.

8 Claims, No Drawings

PROCESS FOR PREPARING WOOD PRESERVATIVE COMPOSITIONS

BACKGROUND OF THE INVENTION

1. Field of the Invention

This invention relates to wood preservative compositions and to a method for their manufacture.

2. Brief Description of the Prior Art

Compositions containing, as active ingredients, compounds of copper, of chromium and of arsenic, hereafter called copper/chrome/arsenic compositions, are in widespread use as wood preservatives. Such compositions are required to be water-soluble and are generally made available as powder, as slurries of solid and solution, or as concentrated solutions, each for dissolution and/or dilution in water before use.

Salt type copper/chrome/arsenic wood preservative compositions are in common use. Such compositions may include ingredients in salt form the reaction of which may result in a content of "inert" ingredients such as, for example, sodum sulphate.

Examples of certain salt-type copper/chrome/arsenic wood preservative compositions are described in British Standard No. 4072 That Standard specifies two formulations identified as Type 1 and Type 2 containing mixtures of copper sulphate, sodium dichromate or potassium dichromate and hydrated arsenic pentoxide. These mixtures may be made available as a mixture of dry ingredients, or as a paste mixture in water of the ingredients, or as separate parcels of the dry ingredients in the correct relative quantities in a single container. Where the ingredients are supplied separately it is essential to dissolve them in the order (a) dichromate, (b) copper sulphate and (c) arsenic pentoxide and to agitate the solution for at least 5 minutes at ambient temperature between each addition to obtain a suitable working solution. The compositions of Type 1 and Type 2 formulations as specified in the aforementioned Standard No. 4072 are as follows:

| | Type 1 | Type 2 |
|---|---|---|
| Copper sulphate - expressed as $CuSO_45H_2O$ | 32.6% | 35.0% |
| Dichromate - expressed as $K_2CR_2O_7$ or $Na_2Cr_2O_7.2H_2O$ | 41.0% | 45.0% |
| Arsenic- expressed as $As_2O_5.2H_2O$ | 26.4% | 20.0% |

Examples of similar compositions which have been Standardised by the American Wood Preservers Association as Types A, B and C are as follows:

| | Type A | Type B | Type C |
|---|---|---|---|
| Copper sulphate - expressed as CuO | 18.1 | 19.6 | 18.5 |
| Sodium dichromate - expressed as $CrO_3$ | 65.5 | 35.3 | 47.5 |
| Arsenic - expressed as $As_2O_5$ | 16.4 | 45.1 | 34.0 |

It would be desirable to include copper arsenate in copper/chrome/arsenic wood preservative compositions since this is a readily produced chemical and the use as a single compound as a source of both copper and arsenic would apparently facilitate formulation. One method of preparing copper arsenate is described in U.S. Pat. No. 4,103,000 the product being, according to that patent "inexpensive and easy to prepare". The method so described comprises reacting copper metal with arsenic acid in the presence of an oxidising agent and an acid catalyst selected from the group consisting of nitric acid, hydrochloric acid and sulphuric acid. Oxygen may be sparged into the reaction mixture, preferably under pressure, as the oxidising agent, although nitric acid is the catalyst usually employed and in this case the use of a further oxidising agent is optional.

Other methods for the production of copper arsenate are available, for example the reaction of copper sulphate with sodium arsenate or arsenic acid followed by neutralisation with sodium carbonate or sodium hydroxide to precipitate the copper arsenate thereby to effect at least partial separation thereof from the sulphate ions present in the reaction medium.

Yet a further method for the production of copper arsenate is disclosed in U.S. Pat. Specification No. 2,388,496. According to that method calcium arsenate is used as the source of arsenic. Calcium arsenate occurs in nature as the mineral haidingerite.

However, to achieve the inclusion of copper arsenate in copper/chrome/arsenic wood preservative compositions it has been found necessary, according to U.S. Pat. No. 2,438,511, to include, also, chromium trioxide. According to that patent chromium trioxide is used in a substantial amount at least sufficient to maintain the copper arsenate in solution when the ingredients are added to water, for example, preferably, in an amount of 15 parts by weight of chromium trioxide to 11 parts by weight of copper arsenate. In U.S. Pat. No. 4,103,000 it is confirmed that the addition of chromic acid in the appropriate amount to copper arsenate slurries results in a rapid and complete dissolution of the copper arsenate into concentrated aqueous copper/chrome/arsenic compositions.

Chromium trioxide is an expensive ingredient and it would be of benefit to enable copper arsenate to be utilised in copper/chrome/arsenic wood preservative compositions in the absence of, or in the presence of a reduced quantity of, chromium trioxide. Sodium dichromate would be a more economic source of chromium for such compositions.

The present invention provides a process for the production of a copper/chrome/arsenic wood preservative composition utilising both copper arsenate, as a source of copper and of arsenic, and sodium dichromate as a source of chromium.

SUMMARY OF THE INVENTION

The process according to the present invention comprises mixing copper arsenate and alkali metal, preferably sodium or alternatively or additionally potassium dichromate in an aqueous medium characterised in that there is introduced into the aqueous medium a quantity of an added acid effective to produce a product that is water-soluble.

DETAILED DESCRIPTION OF THE INVENTION

The product directly produced according to the invention is homogeneous, in the sense that only a single phase is present often giving the appearance of a paste which includes the aqueous medium utilised.

By "added acid" is meant an acid which does not contribute to the essential ingredients of the composition since the quantities of these ingredients are already determined by the required product specification. Arsenic acid is exluded from the term "added acid" since the quantity of this acid which would be required would increase the arsenic content of the product to above the content required in most copper/chrome/arsenic wood preservative compositions. Chromic acid is also excluded from the term it being a purpose of this invention to provide a substitute for this substance. Of course the use of a further source of arsenic, or indeed of copper, to adjust to the desired product ratio in respect of these ingredients from that of the copper arsenate, is not excluded from this invention.

The added acid is preferably one which does not chelate with any of the ingredients of the composition to any substantial extent and is preferably one which does not act to alter the valency state of any of the metals comprising the said ingredients. Ortho-phosphoric acid for example is preferably not used since it has a strong tendency to cause the reduction of chromium to the trivalent state. Certain organic acids are known to have a strong chelating effect.

Preferably the added acid is a strong acid, organic or mineral, for example one giving a pH in a 0.1 Normal aqueous solution of 2.8 or below, particularly preferably 2.5 or below.

Suitably the added acid may be, for example, nitric hydrochloric, sulphuric or formic acid although sulphuric acid is particularly preferred since sulphate ions are a common inactive ingredient of salt type wood preservative compositions.

Attempts to combine copper arsenate and sodium dichromate in an aqueous medium without the presence of added acid according to the invention gives a large quantity of a water-insoluble precipitate which cannot be utilised in aqueous wood preservative compositions. The inclusion of restricted quantities of added acid makes no apparent difference to the nature of the solid precipitate apparently only confirming the teaching in the prior art that the presence of chromic acid is essential to produce water-soluble copper/chrome/arsenate compositions. The Applicants have found that if a substantial quantity of a suitable added acid is included in the aqueous medium the precipitate becomes capable of being dissolved in water and that even larger quantities of added acid within accepted pH levels result in a product which becomes progressively more readily soluble in water.

According to one aspect of the present invention the addition of acid is preferably such as to produce a solid product which is soluble in water in, preferably, not more than 30 minutes, particularly preferably not substantially more than 10 minutes. In determining the speed of dissolution the product is introduced into water at a concentration of 20 $g/l^{-1}$ which is agitated until the solid product has dissolved. This is within the normal working range of 1-5% by weight.

According to an alternative aspect of the present invention the addition of acid is preferably such as to bring the pH of the reaction mixture, after equilibration, which without the inclusion of the added acid is generally above 1.0, to below 1.0 particularly preferably to below 0.05 and most preferably to 0 or below.

According to yet a further alternative aspect of the present invention the addition of acid is preferably such as H to produce a pH, in the 20 $g/l^{-1}$ concentration liquor produced as just above described, typically within the range 1.6-3.0 and particularly preferably within the range 1.6 to 2.6.

For the above purposes of the invention the added acid is preferably at a suitable concentration, for example at least 90% w/w in water, sulphuric acid having a concentration of at least 95% being particularly preferred.

The copper arsenate used according to this invention may be produced by any suitable means. Sodium dichromate is commonly produced by treating sodium chromate with sulphuric acid followed by suitable separation and purification process steps and is generally available as an article of commerce.

The quantities of copper arsenate, and additional arsenic acid, sodium arsenate or copper salt if required, and sodium dichromate, utilised in the practice of this invention, are selected to give any required content of copper, of chromium and of arsenic which content may, for example, correspond to any of those given above as representing Standard compositions or intermediate compositions therebetween.

A preferred procedure for the preparation of a copper/chrome/arsenic wood preservative composition according to this invention is to prepare an aqueous medium containing the added acid and if required, arsenic acid or sodium arsenate and to introduce the copper arsenate and the alkali metal dichromate into that medium. The copper arsenate may be damp in which case it is preferably introduced before the sodium dichromate. If the copper arsenate is dry either compound may be added first. The temperature of the aqueous medium is preferably maintained, at not more than about 40° C., particularly preferably from about 15° C. to 40° C., during and after the addition of the copper arsenate and the dichromate. Particularly preferably the temperature is maintained at not more than 35° C. during the addition of the dichromate. Temperature control may be achieved by external cooling or by control of the rate and/or timing of the addition of the ingredients. If the temperature is allowed to rise to above about 40° C. insolubilisation of the copper/chrome/arsenic product results to a degree depending on the extent of the deviation from the indicated temperature range. The aqueous medium is preferably maintained in agitation during the addition of the ingredients and, particularly preferably, for a further period, suitably 0.5 to 2 hours, to allow equilibration. The above procedure may be varied. For example some of the ingredients may be included as more than one portion and/or in admixture with other ingredients subject to the desired end result being attained. A small proportion of chromium trioxide may be used if desired although the benefit of the invention may be reduced thereby.

In the above description it is understood that equivalent materials may be substituted for those disclosed without departing from the scope of the invention. For example, potassium dichromate may be used in place of or in partial substitution for, sodium dichromate.

The products of this invention, diluted into any desired working concentration may be used directly to treat wood, which may be in the form of sawn pieces or in the form of chipboard, blockboard, plywood or the like whether before or after finishing or use, by impregnation of the wood with the working solution followed usually by drying.

The invention will now be illustrated by the following examples of the production of a formulation corresponding to Type 1 identified on page 2 above. Examples 1–3 are not according to this invention, insufficient added acid being used in them, and Examples 4–6 are according to the invention.

EXAMPLES 1-6

Six separate preparations were conducted. In each preparation 16.76 g of 80% wt aqueous arsenic acid and the amount of added water and of 98% wt concentration sulphuric acid indicated in the following Table were mixed together with continued stirring and the temperature allowed to fall to 25° C. 32.2 g copper arsenate (25.7% Cu, 24.2% As) in the form of a damp filter cake was then added to the stirred medium over a short period the temperature not rising to above 40° C. Stirring was continued until the temperature fell to below 34° and 36.0 g of anhydrous sodium dichromate was then added at a rate which allowed the temperature to remain at below 34° C. After this addition was completed stirring was continued for a further period of one hour to allow the reaction mixture to equilibrate. The pH of the resulting medium was then determined and is identified as pH (EQ) in the following Table.

In the case of Examples 1 to 3 water-insoluble sludges in a separate aqueous phase were produced. These sludges did not dissolve to form a solution even when sufficient water was added to produce a 20 g/l$^{-1}$ concentration of the sludge followed by mixing for 1 hour. In the case of Examples 4 to 6 the products were substantially homogeneous pastes which were fully soluble and could be converted into 20 g/l$^{-1}$ solutions by the addition of water and mixing for the time noted in the following Table. The pH of the 20g/l$^{-1}$ mixture in the case of Examples 1 to 3 and of the 20 g/l$^{-1}$ solution in the case of Examples 4–6 was determined and is identified in the following Table as pH (20 gl$^{-1}$).

TABLE

| Ex | g $H_{2}so^{4}$/ 100 g product | g $H_2O$ | pH (EQ) | Solubility after - minutes | pH (20 g/l$^{-1}$ |
|---|---|---|---|---|---|
| 1 | 0 | 15 | 1.1 | — | 3.2 |
| 2 | 3 | 12 | 0.25 | — | 2.6 |
| 3 | 6 | 9 | 0.05 | — | 2.6 |
| 4 | 9 | 6 | <0 | 30 mins | 2.6 |
| 5 | 12 | 3 | <0 | 10 mins | 2.6 |
| 6 | 15 | 0 | <0 | 1 min | 1.9 |

In the column headed "Solubility" the symbol "—" denotes insolubility after 1 hour. The product of each of Examples 4–6, and particularly the latter two examples, are suitable for use as wood preservatives.

We claim:

1. A process for the production of a copper/chrome/arsenic wood preservative composition comprising mixing copper arsenate and alkali metal dichromate in an aqueous medium in the presence of an added acid selected from the group consisting of nitric acid, hydrochloric acid, sulphuric acid and formic acid effective to produce a pH in the aqueous medium below 0.05, thereby to produce a water-soluble product.

2. A process as claimed in claim 1 wherein the added acid is sulphuric acid.

3. A process as claimed in claim 1 wherein an aqueous medium containing the added acid is formed and the copper arsenate and the alkali metal dichromate are added to the so-formed medium.

4. A process as claimed in claim 3 wherein the temperature is maintained at below 40° C. until the addition of the copper arsenate and the alkali metal dichromate has been completed.

5. A process as claimed in claim 4 wherein the temperature is maintained at below 35° C. during the addition of the alkali metal dichromate.

6. A process as claimed in claim 3 wherein sodium dichromate is added to the aqueous medium after the copper arsenate.

7. A process as claimed in claim 3 wherein the mixing of the copper arsenate and the alkali metal dichromate with the aqueous phase is performed under agitation.

8. A process as claimed in claim 7 wherein the agitation is maintained for at least a further 0.5 hours after the mixing has been completed.

* * * * *